US008970802B2

(12) United States Patent
Cheng

(10) Patent No.: US 8,970,802 B2
(45) Date of Patent: Mar. 3, 2015

(54) DISPLAY DEVICE, BACKLIGHT MODULE AND MAINFRAME STRUCTURE UNIT THEREOF

(75) Inventor: Jiahe Cheng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 245 days.

(21) Appl. No.: 13/579,565

(22) PCT Filed: Jun. 8, 2012

(86) PCT No.: PCT/CN2012/076639
§ 371 (c)(1),
(2), (4) Date: Aug. 17, 2012

(87) PCT Pub. No.: WO2013/177820
PCT Pub. Date: Dec. 5, 2013

(65) Prior Publication Data
US 2013/0321739 A1    Dec. 5, 2013

(51) Int. Cl.
G02F 1/1333    (2006.01)

(52) U.S. Cl.
USPC .......................................................... 349/58

(58) Field of Classification Search
USPC ........................................................... 349/58
See application file for complete search history.

(56) References Cited

U.S. PATENT DOCUMENTS

2011/0085107 A1*   4/2011   Noh et al. ...................... 349/61

* cited by examiner

Primary Examiner — Wen-Ying P Chen
(74) Attorney, Agent, or Firm — Andrew C. Cheng

(57) ABSTRACT

The present invention discloses a display device which is configured with a liquid crystal display panel and a backlight module. The backlight module includes at least an optical film and a mainframe structure which includes a plastic frame and a backboard integrally with the plastic frame. The backboard includes an integral bottom to support the optical films of the backlight module, and a first sidewall. Wherein the plastic frame is integrally formed with a carrying portion, a second sidewall, and a supporting portion, wherein the carrying portion is used to position optical films, and also support the liquid crystal display panel, wherein to receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard. The present invention readily increases the stability and firmness of the plastic frame.

12 Claims, 2 Drawing Sheets

DISPLAY DEVICE, BACKLIGHT MODULE AND MAINFRAME STRUCTURE UNIT THEREOF

FIELD OF THE INVENTION

The present invention relates to a technologic field of liquid crystal display, and more particularly to a backlight module and a frame unit incorporated with the backlight module. The present invention further includes a liquid crystal display device incorporated with such a backlight module.

DESCRIPTION OF PRIOR ART

Currently, a backlight module used in a liquid crystal display device generally includes a mainframe, structure configured with a plastic frame and a backboard. The plastic frame and the backboard are interengaged by means of sidewalls of the plastic frame.

Substantially, the plastic frame has the sidewall corresponding to the sidewalls of the backboard. In assembling, screws or other suitable fastening devices or arrangements can be applied. However, the mere engagement with screws is not reliable and with poor shock prevention such that separation between the plastic frame and the backboard could be happened once external forces are applied. As a result, the stability of the Overall configuration is poor.

In addition, if an extension from the plastic frame is used to support the liquid crystal display panel, then the sidewall of the backboard will also be integrally formed with projections passing through the extension of the plastic frame. By this arrangement, the plastic frame can also be properly engaged with the backboard. However, sharp edges of the protections of the backboard can readily scratch the liquid crystal display panel. In addition, under the pressure of the liquid crystal display panel, the extension could be pushed hack to incline toward the backboard. Accordingly, the fixture to the liquid crystal display is really poor.

SUMMARY OF THE INVENTION

The purpose of the present invention is to provide a display device, a backlight module and a mainframe structure unit so as to upgrade the stability and reliability of the plastic frame.

In order to resolve the technical issue encountered by the prior art, the present invention introduce a technical solution by providing a mainframe structure used for backlight module configured with a plastic frame and a backboard. Wherein the backboard includes an integral bottom for supporting optical films of the backlight module and a first sidewalk. Wherein the plastic frame is integrally formed with a carrying portion, a second sidewall, and a supporting portion, wherein the carrying portion is used tier positioning optical films, and also supporting the liquid crystal display panel. Wherein a receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard.

Wherein the bottom of the backboard is defined with opening in which the positioning block is received therein, wherein the supporting main portion abuts against the bottom of the mainboard so as to limit a distance of the carrying portion to the bottom of the mainboard.

Wherein the opening is embodied as a circular hole or a polygonal hole, wherein the corresponding positioning block is a cylindrical column or polygonal column.

Wherein the opening passing through the bottom of the mainboard.

Wherein the first sidewall is provided with a fastener retaining the first sidewall within the receiving slot defined by the second sidewall and the supporting main, portion.

Wherein the receiving slot is provided with a retainer interengaged with the fastener of the first sidewall, wherein the engagement between the receiving slot and the fastener keeps the first sidewall remained within the receiving slot.

Wherein the fastener is an embossment.

Wherein the carrying portion, the second sidewall and the supporting portion jointly define an "F-shaped" configuration view from side.

In order to resolve the technical issue encountered by the prior art, the present invention introduce a technical solution by providing a backlight module which is configured with at least an optical film, and a mainframe structure, wherein the mainframe structure includes a plastic frame and a mainboard incorporating with the plastic frame. Wherein the backboard includes an integral bottom for supporting optical films of the backlight module, and a first sidewall. Wherein the plastic frame is integrally formed with a carrying portion, a second sidewall, and a supporting portion, wherein the carrying portion is used tier positioning optical films, and also supporting the liquid crystal display panel, wherein a receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard.

Wherein the bottom of the backboard is defined with opening in which the positioning block is received therein, wherein the supporting main portion abuts against the bottom of the mainboard so as to limit a distance of the carrying portion to the bottom of the mainboard.

Wherein the opening passing through the bottom of the mainboard.

Wherein the first sidewall is provided with a listener retaining the first sidewall within the receiving slot defined by the second sidewall and the supporting main portion. Wherein the fastener is an embossment.

In order to resolve the technical issue encountered by the prior art, the present invention introduce a technical solution by providing a display device which is configured with a liquid crystal display panel and a backlight module, the backlight module including at least an optical film and a mainframe structure which includes a plastic frame and a backboard integrally with the plastic frame. The backboard includes an integral bottom to support the optical films of the backlight module, and a first sidewall. Wherein the plastic frame is integrally formed with a carrying portion, a second sidewall, and a supporting portion, wherein the carrying portion is used to position optical films, and also support the liquid crystal display panel, wherein a receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard.

Wherein the bottom of the backboard is defined with opening in which the positioning block is received therein, wherein the supporting main portion abuts against the bottom of the mainboard so as to limit a distance of the carrying portion to the bottom of the mainboard.

Wherein the opening passing through the bottom of the mainboard.

In the current embodiment, the plastic frame is interconnected to the carrying portion by means of the supporting main portion of the supporting portion, the positioning portion is engaged with the bottom, for example, by abutting against, screwing, or welding. As a result, the carrying portion of the plastic frame can securely support the liquid crystal display panel, while will not be crushed because of its compression. As a result, the optical films are also properly positioned. In addition, since the positioning block and the bottom can effectively prevent the transversal movement of the plastic frame when the plastic flame is exposed with external pressure, accordingly, the stability and firmness of the plastic frame are enhanced. As such, the mainframe structure made in according to the first embodiment of the present invention is firm and reliable without readily being damaged, the service life of the final product is also prolonged.

DETAILED DESCRIPTION OF DRAWINGS

DETAILED DESCRIPTION OF PREFERRED EMBODIMENT

Detailed description will be given along with the accompanied drawings illustrating the preferred embodiments of the present invention. It should be noted that the embodiments are merely for illustration while should not be construed as a limitation to the present invention.

Figure 1:
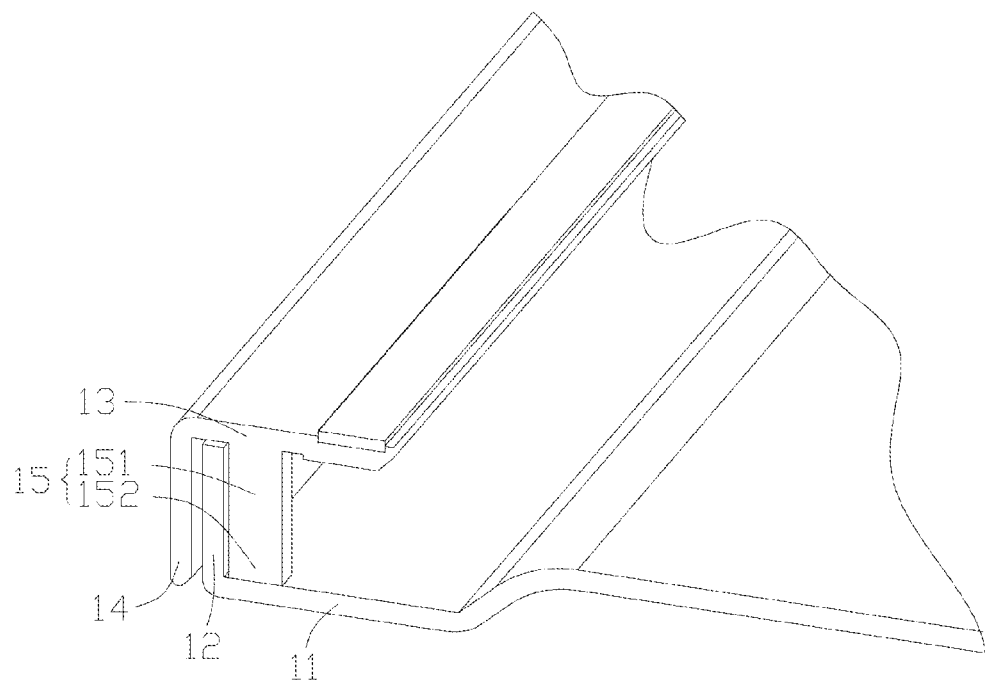
FIG. 1 is a partial and structural view of a mainframe structure made in accordance with a first embodiment of the present invention.

Embodiment 1, referring to FIG. 1, which is a partial and structural view of a mainframe structure made in accordance with a first embodiment of the present invention.

In the present embodiment, a mainframe structure is preferably used in a backlight module. The mainframe includes a backboard and a plastic frame. It should be noted that its configuration is not limited thereto. The backboard includes at least a bottom 11, and a first sidewall 12. The plastic frame includes at least a carrying portion 12, a second sidewall 14 and a supporting portion 15.

In the present embodiment, the bottom 11 is used to carry and support optical films of the backlight module. Elastic and buffering pad or the similar can be arranged onto a surface in which the optical film is disposed so as to prevent the optical films from being damaged resulted from shock and vibration. Since this is readily known to the skilled in the art, and no detailed is given herebelow.

The first sidewall 12 is interconnected to the bottom 11 of the backframe. The first sidewall 12 can extend along a direction in which the optical films are disposed so as to integrally formed with a wall. Alternatively, the first sidewall 11 can be individually formed, and then attached to the bottom 11 by screws or welding. No limitation should be imposed on this portion.

The carrying portion 13 is arranged on the bottom 11 in an alternative manner. The carrying portion 13 on the bottom 11 is used to support the optical films, and also support the liquid crystal display panel. Of course, in order to prevent the liquid crystal display panel being scratched by the carrying portion 13, buffering and elastic pad can be arranged between the carrying portion 13 and the liquid crystal display panel.

The second sidewall 14 is interconnected to the carrying portion 13. In one of the embodiment, the second sidewall 14 and the carrying, portion 13 can be integrally formed into an L-shaped configuration. The L-shaped arranged second sidewall 14 and the carrying, portion 13 can be properly arranged onto the backboard so as to define a receiving space to receive the optical films therein.

The supporting portion 15 is integrally with a supporting main portion 151 and a positioning block 152. Alternatively, those elements can be formed individually. The supporting main portion 151 is interconnected to the carrying portion 13. In a preferred embodiment, the supporting portion 15 and the L-shaped arranged carrying portion 13 and the second sidewall 14 are jointly configuring an "IF" configuration viewing from side. That is to say, the supporting portion 15 is arranged next to the second sidewall 14 in that semi-enclosure configuration. By this arrangement, the second sidewall 14 and the supporting portion 15 jointly defining a receiving slot (not labeled), and the first sidewall 12 is received therein. The positioning block 152 is used to prevent the plastic frame from creating transversal movement with respect to the backboard.

It should be noted that when the supporting portion 15 is assembled, its overall length is longer than a distance from the carrying portion 13 to the bottom 11 of the backboard so as to ensure its supporting effect. Furthermore, this will further ensure a stability and security of plastic frame to support the liquid crystal display panel and the optical films.

In the current embodiment, the plastic frame is interconnected to the carrying portion 13 by means of the supporting main portion 151 of the supporting portion 15, the positioning portion 152 is engaged with the bottom 11, for example, by abutting against, screwing, or welding. As a result, the carrying portion. 13 of the plastic frame can securely support the liquid crystal display panel, while will not be crushed because of its compression. As a result, the optical films are also properly positioned. In addition, since the positioning block 152 and the bottom 11 can effectively prevent the transversal movement of the plastic frame when the plastic frame is exposed with external pressure, accordingly, the stability and firmness of the Plastic frame are enhanced. As such, the mainframe structure made in according to the first embodiment of the present invention is firm and reliable without readily being damaged, the service life of the final product is also prolonged.

Figure 2:
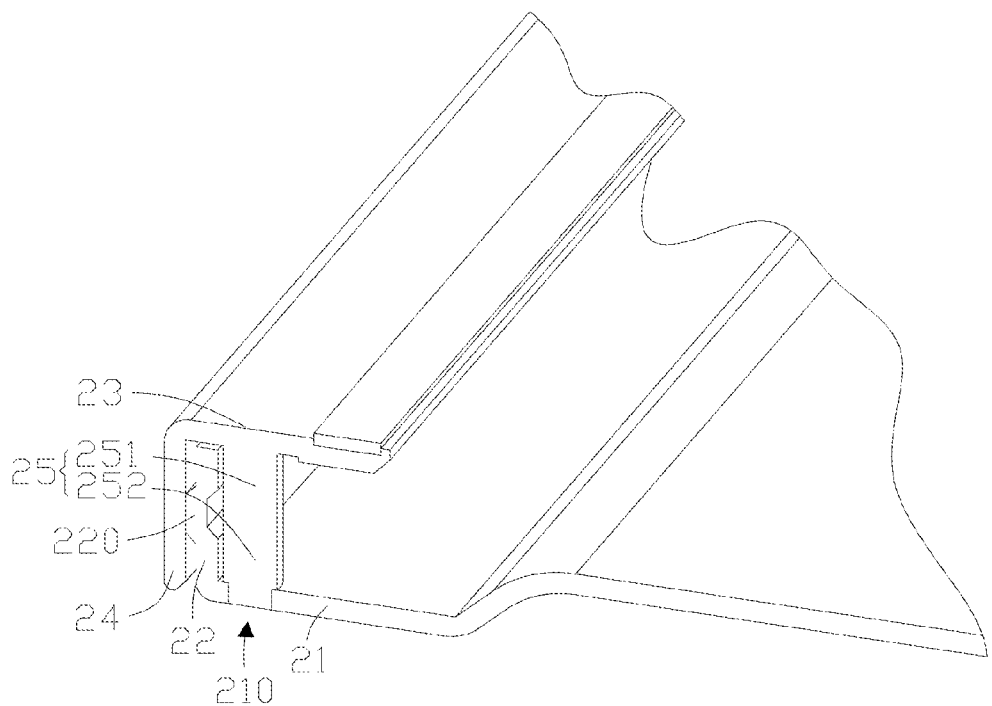
FIG. 2 is a partial and structural view of a mainframe structure made in accordance with a second embodiment of the present invention.

Referring to FIG. 2, which is a partial and structural view of a mainframe structure made in accordance with a second embodiment of the present invention.

The mainframe structure can be preferably incorporated into a backlight module, and which is configured with the backboard and the plastic frame, but not limited thereto. As described above, the backboard includes a bottom 21 and a first sidewall 22, and the plastic frame includes a carrying portion 23, a second sidewall 24 and a supporting portion 25 which is configured with a supporting main portion 251 and a positioning block 252. In addition, both the backboard and the plastic frame are not limited to be configured such elements. Furthermore, the internal relationship of those elements and parts are identical to what disclosed in the first embodiment, as such, no further description is given below.

The difference between the first and second embodiments is: the bottom 21 is provided with a positioning portion 210, and the supporting portion 25 is interconnected with the positioning portion 210. The positioning portion 210 is embodied as an opening or recess. Preferably, the positioning portion 210 is embodied as the opening, and the positioning block 252 is embodied as a column and retained within the opening. Meantime, when the supporting main portion 251 abuts against the bottom 21, it further limits the distance of the carrying portion 23 to the bottom 21. Of course, the positioning portion 210 can be embodied as an embossment, and the positioning block 252 can be arranged with openings to facilitate the interconnection between the supporting portion 25 and the positioning portion 210. In addition, the opening can be a circular hole and passes through the bottom 21. The positioning block 252 can be embodied as a cylindrical column to match with it.

It should be noted that in order to firmly secure the plastic frame so as to ensure the stability and firmness of the mainframe structure, a fastener 220 is arranged on the first sidewall 22 which are disposed within the receiving slot. By the provision of the fastener 220, the first sidewall 22 can be readily secured within the receiving slot. Substantially, the fastener 220 is embodied as an embossment made from elastic material. Alternatively, it can be a bent portion integrally formed with the first sidewall 22. Once the first sidewall 22 is pushed into the receiving slot, the embossment 220 will be compressed and deformed such that the first sidewall 22 can be firmly locked up in the receiving slot. Without incurring any additional cost, the receiving slot can be arranged with a retainer (not shown in the Figure), for example, in the second sidewall 24 or the supporting portion 25 located within the receiving slot, a lockup slot or a locking button can be provided. By the engagement of the retainer and the fastener 220, the first sidewall 22 can be further firmly retained.

In the current embodiment, by the interactive functions of the positioning portion 210 and the fastener 220, the carrying portion 23 of the plastic frame can securely support the liquid crystal display panel, while will not be crushed because of its compression. The transversal movement of the plastic frame when the plastic frame is exposed with external pressure is effectively prevented. Accordingly, the stability and firmness of the plastic frame are enhanced. As such, the mainframe structure made in according to the first embodiment of the present invention is firm and reliable without readily being damaged, the service life of the final product is also prolonged.

Figure 3:
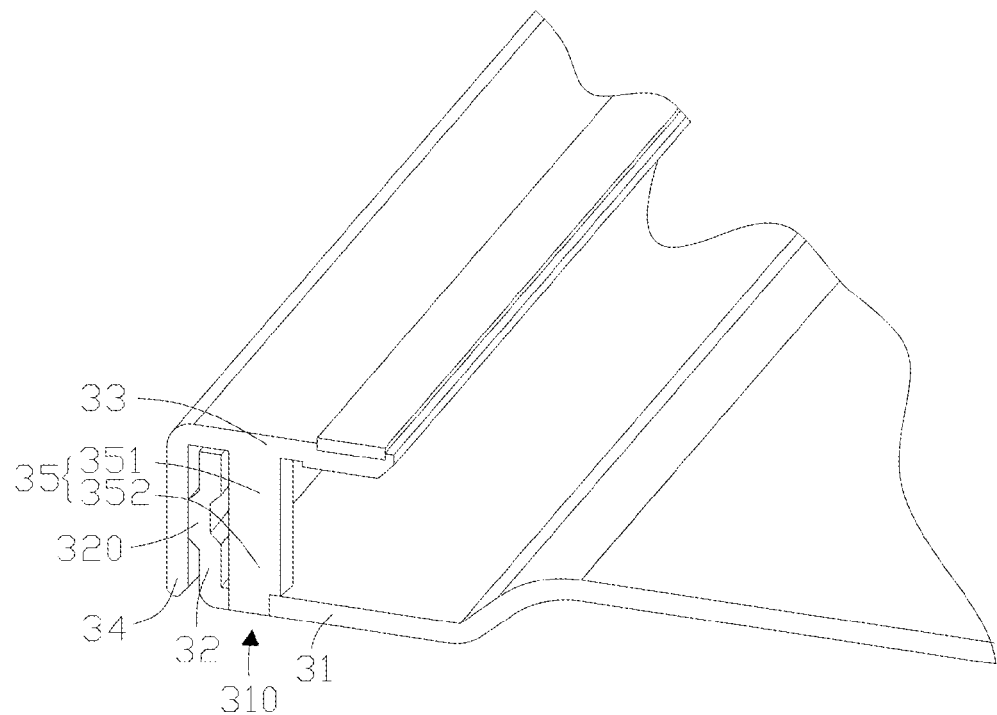
FIG. 3 is a partial and structural view of as mainframe structure made in accordance with a third embodiment of the present invention.

Referring to FIG. 3 which is a partial and structural view of a mainframe structure made in accordance with a third embodiment of the present invention.

In the current embodiment, the mainframe structure is preferably included in the backlight module. The mainframe structure at least includes a backboard and a plastic frame. As disclosed above, the backboard includes but not limited to the bottom 31, the first sidewall 32. The plastic frame includes a carrying portion 33, a second sidewall 34, and a supporting portion 35. The supporting portion 35 includes a supporting main portion 351 and a positioning block 352. The bottom 31 is provided with a positioning portion 310. The first sidewall 32 is provided with a fastener 320. The detailed configuration of the fastener 320 can be referred to the embodiments disclosed above. As it is within the knowledge of the ordinary skilled in the art. No details are given here below.

The difference between this and the second embodiment is that the positioning portion 310 is a polygonal opening, such as a triangular, square or a pentagonal shape. Corresponding to the shape of the opening, the positioning block 352 is also embodied with a polygonal shape, i.e. a cross sectional of the positioning block 352 in parallel to the bottom 31 is also a polygonal shape. With the multiple sides of the opening and the positioning block 352, the positioning block 352 can be readily prevented from rotating within the positioning portion 310, and again ensure the stability and firmness of the plastic frame.

In the current embodiment, the positioning portion 310 is embodied with polygonal opening, and the positioning block 352 is also embodied as a polygonal configuration. As such, with the interactive functions of the positioning portion 310 and the positioning block 352, the carrying portion 33 of the plastic frame can securely support the liquid, crystal display panel, while will not be crushed because of its compression. The transversal movement of the plastic frame when the plastic frame is exposed with external pressure is effectively prevented. Accordingly, the stability and firmness of the plastic frame are enhanced. As such, the mainframe structure made in according to the first embodiment of the present invention is firm and reliable without readily being damaged, the service life of the final product is also prolonged.

Embodiment IV. The present invention further provides a backlight module which includes at least an optical film and a mainframe structure illustrated in any one of the first, second and third embodiment described above.

Wherein, in the present embodiment, the mainframe structure can be selected from any one of the first to third embodiments. Of course, it can be embodied with any other suitable or existing mainframe structure known to the skilled in the art. It is therefore should not be limited thereto.

As such, the mainframe structure incorporated within the backlight module in the current embodiment of the present invention is firm and reliable without readily being damaged, the service life of the final product is also prolonged.

Figure 4:
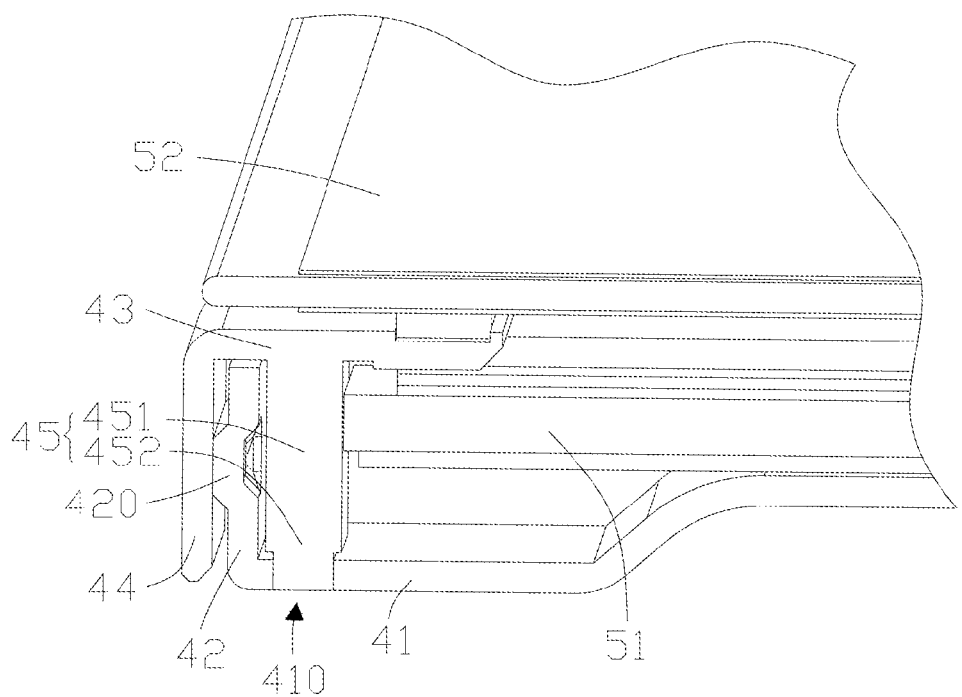
FIG. 4 is a partial and structural view of a display device made in accordance with the present invention.

Embodiment V. Referring to FIG. 4, which is a partial and structural view of a display device made in accordance with the present invention.

In this embodiment of a liquid crystal display device, it generally includes a backlight module, at least one optical film 51 disposed within the backlight module, and a liquid crystal display panel 52.

In this embodiment, the backlight module is incorporated with a mainframe structure selected from the second or the third embodiment. As described above, the mainframe structure includes a backboard and a plastic frame. The backboard includes a bottom 41 and a first sidewall 42, and the plastic frame includes a carrying portion 43, a second sidewall 44, and a supporting, portion 45. It should be noted that additional elements or parts can be included into the backboard and the plastic frame, and should not be construed to limit thereto. The supporting portion 45 is configured. In addition, the supporting portion 45 includes a supporting main portion 451 and a positioning block 452. The bottom 41 is provided with a positioning portion 410, and the first sidewall 42 is provided with a fastener 420. The substantial and inter relationship can be referred to the embodiments disclosed above. As such, it would be readily known to the skilled in the art, and no further description is given.

Wherein the bottom 41 is used to carry at least one optical film 51, and the carrying portion 43 is used to position the optical film 51 as well as support as liquid crystal display panel 52. The optical film 51 and the liquid crystal display panel 52 can be facilitated directly from the existing arts, and it can be readily understood by the skilled in the art. As a result, no limitation should be imposed thereto.

In this embodiment, the plastic frame of the display device has its supporting main portion 451 of the supporting portion 45 to interconnect with the carrying portion 43, and with the positioning block 452 to incorporate with the bottom 41 in a way that the carrying, portion 43 can firmly and stably support the liquid crystal display panel 52 without being crushed and deformed by the panel 52. Meanwhile, the optical film 51 has also been positioned. In addition, because the positioning block 452 is incorporating with the bottom 41, the transversal movement of the plastic frame is also prevented. Accordingly, it readily upgrades the stability and firmness of the plastic frame.

Because of being incorporated with the plastic frame, the display device of the current embodiment of the present invention is firm and reliable without readily being damaged, the service life of the final product is also prolonged.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A mainframe structure used for backlight module configured with a plastic frame and a backboard, wherein:
   the backboard includes an integral bottom for supporting optical films of the backlight module, and a first sidewall;
   wherein the plastic frame is integrally formed with a carrying portion, a second sidewall, and a supporting portion, wherein the carrying portion is used for positioning optical films, and also supporting the liquid crystal display panel, wherein a receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard;
   wherein the bottom of the backboard is defined with opening in which the positioning block is received therein, wherein the supporting main portion abuts against the bottom of the mainboard so as to limit a distance of the carrying portion to the bottom of the mainboard;
   wherein the opening is embodied as a circular hole or a polygonal hole, wherein the corresponding positioning block is a cylindrical column or polygonal column; and
   wherein the opening passing through the bottom of the mainboard.

2. The mainframe structure as recited in claim 1, wherein the first sidewall is provided with a fastener retaining the first sidewall within the receiving slot defined by the second sidewall and the supporting main portion.

3. The mainframe as recited in claim 1, wherein the receiving slot is provided with a retainer interengaged with a fastener of the first sidewall, wherein the engagement between the receiving slot and the fastener keeps the first sidewall remained within the receiving slot.

4. The mainframe structure as recited in claim 2, wherein the fastener is an embossment.

5. The mainframe structure as recited in claim 3, wherein the fastener is an embossment.

6. The mainframe structure as recited in claim 1, wherein the carrying portion, the second sidewall and the supporting portion jointly define an "F-shaped" configuration view from side.

7. A backlight module which is configured with at least an optical film, and a mainframe structure, wherein the mainframe structure includes a plastic frame and a mainboard incorporating with the plastic frame, wherein:
   a backboard includes an integral bottom for supporting optical films of the backlight module, and a first sidewall;
   wherein the plastic frame is integrally formed with a carrying portion, a second sidewall, and a supporting portion, wherein the carrying portion is used for positioning optical films, and also supporting the liquid crystal display panel, wherein a receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard;
   wherein the bottom of the backboard is defined with opening in which the positioning block is received therein, wherein the supporting main portion abuts against the bottom of the mainboard so as to limit a distance of the carrying portion to the bottom of the mainboard; and
   wherein the opening passing through the bottom of the mainboard.

8. The backlight module as recited in claim 7, wherein the first sidewall is provided with a fastener retaining the first sidewall within the receiving slot defined by the second sidewall and the supporting main portion.

9. The mainframe structure as recited in claim 8, wherein the fastener is an embossment.

10. A display device which is configured with a liquid crystal display panel and a backlight module, the backlight module including at least an optical film and a mainframe structure which includes a plastic frame and a backboard integrally with the plastic frame:
    the backboard includes an integral bottom to support the optical films of the backlight module, and a first sidewall;
    wherein the plastic frame is integrally formed with a carrying portion, a second sidewall, and a supporting portion, wherein the carrying portion is used to position optical films, and also support the liquid crystal display panel, wherein a receiving slot is defined between the second sidewall and the supporting main portion such that the first sidewall is received therein, wherein the supporting portion includes an integrally formed main portion interconnected to the carrying portion and a positioning block which prevent the plastic frame from transversal movement with respect to the backboard together with the bottom of the backboard; and
    wherein the receiving slot is provided with a retainer interengaged with a fastener of the first sidewall, wherein the engagement between the receiving slot and the fastener keeps the first sidewall remained within the receiving slot.

11. The displaying device as recited in claim 10, wherein the bottom of the backboard is defined with opening in which the positioning block is received therein, wherein the supporting main portion abuts against the bottom of the mainboard so as to limit a distance of the carrying portion to the bottom of the mainboard.

12. The display device as recited in claim 11, wherein the fastener is an embossment.

\* \* \* \* \*